United States Patent [19]
Ziemelis et al.

[11] 3,774,124
[45] Nov. 20, 1973

[54] INCOHERENT TO COHERENT IMAGE CONVERTER

[75] Inventors: Ojars J. Ziemelis, Sunnyvale; Richard A. Coppock, San Jose; Hartmut Sonnenberg, Sunnyvale; Paul E. Mengers, Redwood City, all of Calif.

[73] Assignee: GTE Sylvania Incorporated, Mountain View, Calif.

[22] Filed: Mar. 28, 1972

[21] Appl. No.: 238,829

[52] U.S. Cl............... 332/7.51, 250/213, 178/5.4, 350/160
[51] Int. Cl........................... H01s 3/10, H01j 31/50
[58] Field of Search.................. 332/7.51; 250/199, 250/213 VT, 225; 178/5.4 E, 5.4 BD, 7.5 D; 313/91; 350/160, 161

[56] References Cited
UNITED STATES PATENTS

| | | | |
|---|---|---|---|
| 3,396,305 | 8/1968 | Buddecke et al. | 315/12 |
| 3,445,826 | 5/1969 | Myers | 250/213 VT |
| 3,693,017 | 9/1972 | Fick et al. | 250/213 VT |
| 3,405,309 | 10/1968 | Goetze et al. | 315/11 |
| 3,499,157 | 3/1970 | Satake et al. | 250/213 VT |

OTHER PUBLICATIONS
"Development Work at SRDE Christchurch," 6/16/71, Electronics Weekly, No. 563.

Primary Examiner—Benjamin A. Borchelt
Assistant Examiner—N. Moskowitz
Attorney—Norman J. O'Malley et al.

[57] ABSTRACT

An incoherent to coherent image conversion system comprises a converter unit having an axially aligned photocathode and electro-optic crystal, a source of coherent light (laser) directed through the crystal from one side and an incoherent light image input directed against the photocathode. The side of the crystal opposite from the coherent light source and facing the photocathode has a dielectric reflective coating which reflects the coherent light back through the crystal for a second pass. Photoelectrons from the photocathode produced by the incoherent image are accelerated and strike the mirrored side of the crystal to deposit a modulated charge pattern on the crystal for correspondingly changing its birefringence characteristic (Pockels effect). The coherent light passing through the crystal is phase modulated according to the image pattern and is directed to suitable optical processing apparatus for utilization.

1 Claim, 5 Drawing Figures

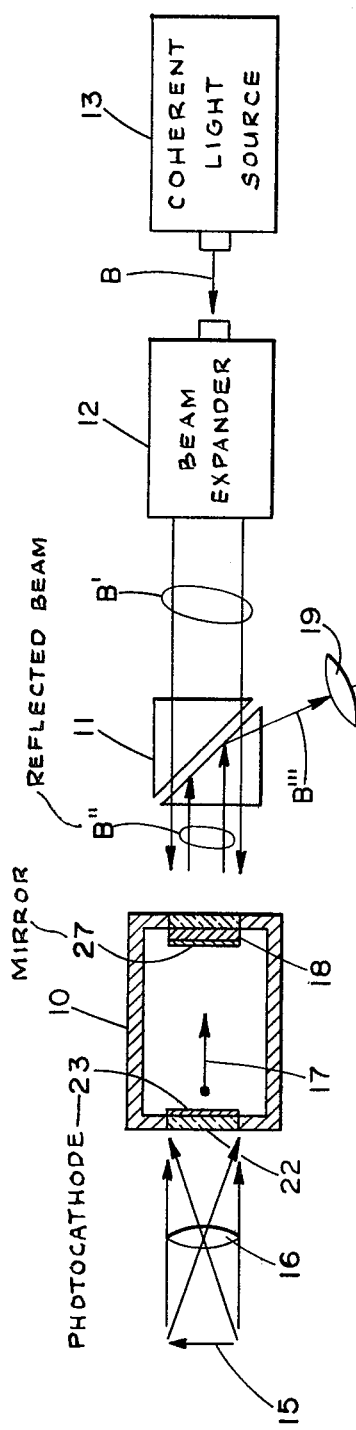
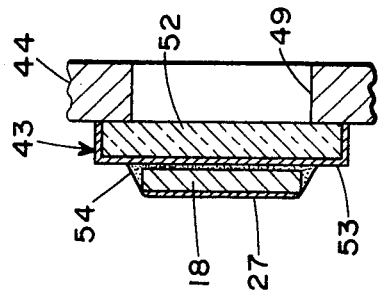
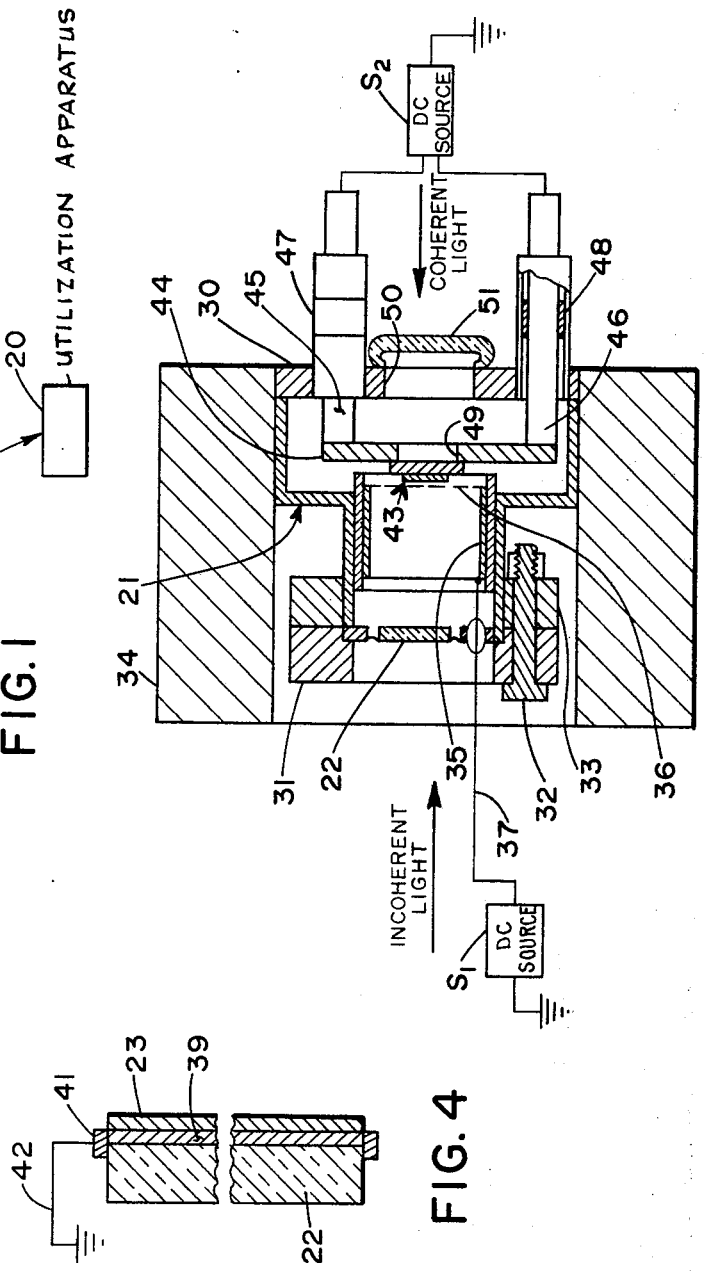
FIG. 1
FIG. 5
FIG. 3
FIG. 4

INCOHERENT TO COHERENT IMAGE CONVERTER

BACKGROUND OF INVENTION

The invention herein described was made under a contract with the Department of the Air Force.

This invention relates to image conversion systems and more particularly to an incoherent to coherent image conversion system.

Expansion of the field of optical-data processing has emphasized the need for real time incoherent to coherent image conversion systems. In such systems, images formed with incoherent light are transformed into images transmitted by spatially modulated coherent-light beam which can be processed by simple lenses and attenuating masks to perform such functions as filtering, auto-correlation and cross-correlation, signal-component rejection, and pattern recognition.

One prior art method of obtaining coherent images is to insert a film transparency bearing the image in the path of a collimated beam obtained from a laser. Such optical processors of two-dimensional data have the disadvantage of requiring the use of films which must be exposed, developed, and mechanically transported to the processor.

Another prior art technique utilizes an image-modulated scanning electron beam to progressively sweep the target surface of an electro-optic crystal and produce the well known longitudinal electro-optic Pockels effect. An example of this technique is the system described in an article by G. Marie entitled *Large-Screen Projection of Television Pictures With An Optical-Relay Tube Based on the Pockels Effect* in Philips Technical Review, No. 8/9/10, 1969, pages 292–298. The disadvantage of the scanning electron beam technique is poor resolution and complexity of apparatus.

An object of this invention is to provide an improved incoherent to coherent image converter that facilitates the real-time conversion of incoherent images into equivalent coherent images.

SUMMARY OF INVENTION

A photocathode, an electro-optical crystal and a coherent laser beam are arranged so that an image formed by an incoherent light is focused on the photocathode. Electrons emitted from the photocathode are accelerated and focused to form a voltage pattern (similar to an image) across the electro-optical crystal. The voltage pattern spatially modulates the birefringent crystal. A dielectric reflective coating on the back surface (photocathode side) of the crystal reflects the laser beam incident on the opposite surface of the crystal so that the latter passes twice through the crystal and emerges as a spatially phase-modulated replica of the original incoherent image.

DESCRIPTION OF THE DRAWINGS

FIG. 1 is a schematic drawing of a conversion system embodying the invention;

FIG. 3 is an enlarged schematic cross-sectional view of the converter unit embodying the invention;

FIG. 4 is a greatly enlarged cross-section of the photocathode assembly; and

FIG. 5 is a greatly enlarged cross-section of the electro-optical crystal assembly.

DESCRIPTION OF PREFERRED EMBODIMENT

Figure 2:
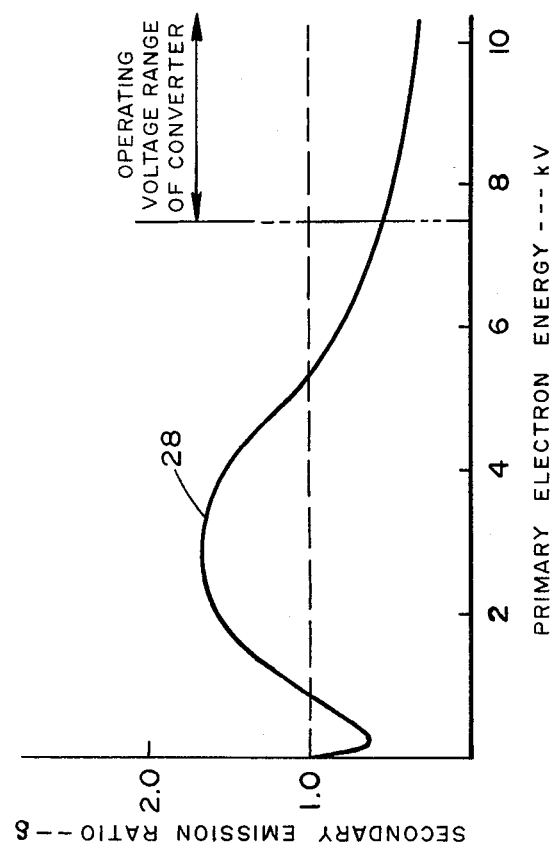
FIG. 2 is a curve showing typical secondary-emission characteristics of a crystal illustrating the preferred operating voltage range of the converter.

Referring now to the drawings, a preferred embodiment of the invention is shown in schematic form in FIG. 1 and comprises a vacuum-tight converter unit 10 described in detail below, a polarizing prism 11 such as a Glan-Thompson prism, a beam expander 12 and a source 13 of coherent light such as a laser. An incoherent image source is indicated by the arrow 15 and is focused by lens 16 on one end of the converter unit 10 and generates photoelectrons indicated by the arrow 17 which transit to the opposite end of the converter unit and impact against an electro-optic crystal 18. Coherent light B from laser 13 is expanded by expander 12 to a wide beam B', passes through prism 11 and crystal 18 from which it is reflected back to prism 11 as an image phase-modulated coherent beam B''. Prism 11 converts the phase-modulated beam to an amplitude-modulated beam B''' and directs it through lens 19 to utilization apparatus 20 such as an optical processor. Thus the converter unit 10 reacts to an image input from an incoherent light source in such a manner as to impress that image on a coherent light beam in real time for use in well-known coherent optical processor apparatus.

Converter 10 comprises a sealed vacuum pumped enclosure 21. The end of enclosure 21 facing the incoherent image source 15 has a window 22 with a photocathode 23 formed on the inner surface. The opposite end of enclosure 21 has another optical window 51. The electro-optic crystal 18 is mounted in axial alignment with photocathode 23. A dielectric mirror 27, see FIG. 5, is formed on the side of crystal 18 facing photocathode 23. An ion pump, not shown, may be used to evacuate the interior of enclosure 21 and produce the required vacuum. Suitable focusing and accelerating means described below direct photoelectrons from the photocathode to crystal 18. Since the photocathode is modulated by the incoherent image incident on it, the resulting photoelectrons which impact against crystal 18 impress a voltage pattern on the latter corresponding to the image. Coherent light passing through and reflected from crystal 18 is therefore electro-optically modulated.

The principle of operation of the electro-optic crystal 18 is based on the Pockels effect wherein certain noncentrosymmetrical crystals exhibit a longitudinal, linear, field-induced birefringence. An electric field applied to the optical axis of such a crystal alters the refractive indices of that material so that the two orthogonal components of randomly polarized light propagating down the optical axis see different refractive indices. The phase difference, $\Delta\phi$, developed by these propagating components through the crystal is proportional only to the applied voltage V, and is given by $$\Delta\phi = KV$$

where K is a constant.

If the amplitudes of the orthogonally polarized waves are selected to be equal and if the crystal is placed between properly oriented crossed polarizers, the transmission, T, through the polarizer electro-optical crystal will vary with applied voltage, and is given by the expression $$T = \sin^2(\phi/2) = \sin^2(KV/2)$$

The utility of an electro-optic crystal for use in the converter unit 10 is characterized by the half-wave voltage, $V_{\lambda/2}$, for which this transmission is maximum, i.e., for which the phase shift is 180°. In the converter unit 10, light passes through the crystal 18 twice and accordingly only one-half of the $V_{\lambda/2}$ voltage is required for a phase shift of 180°. By way of example, a tetragonal phosphate crystal known as potassium dihydrogen phosphate ($KD_2PO_4$), abbreviated KD*P, has a $V_{\lambda/2}$ at a $\lambda = 6328 A$. (He-Ne laser) of 4.4 kV and has been used successfully in a converter unit embodying the invention.

In order to better understand the function of the electro-optic crystal in modulating coherent light in response to voltage changes across the crystal, a brief explanation of the principle involved in converting the photoelectron current into a suitable modulation voltage across the crystal will be given. The photoelectrons, upon striking the crystal, generate secondary electrons. The relationship between secondary electrons and the modulation current through the crystal is governed by the following equation:

$$I_{crystal} = I_B (1-\delta)$$

where $I_{crystal}$ = modulation current through the crystal,
$I_B$ = photoelectron current, and
$\delta$ = secondary-emision ratio or number of secondary electrons per photoelectron.

The secondary-emission ratio $\delta$ is voltage dependent, as shown by the curve 28 in FIG. 2. The maximum electron impact voltage for an operating converter unit was selected to be approximately 10 kV and this voltage drops to about 8 kV with the image impressed on the photocathode. Such a voltage is sufficiently high to permit operation in a voltage range where secondary-emission ratio is less than one. Higher operating voltages are not desirable because of power dissipation in the crystal. Lower voltages will increase the secondary electron emission and hence reduce the modulating current through the crystal.

At the selected operating voltage where the secondary ratio $\delta$ is much less than one most of the photoelectrons that impact against the crystal remain on its surface. The crystal, for example, KD*P at room temperature has finite bulk resistance. Therefore, the photoelectrons provide current through the crystal and the IR voltage drop in the crystal supplies the modulating voltage for it.

Another feature of this converter structure is that the erase mechanism for the system is simple and rapid. When the incoherent light image is removed from the photocathode, the flow of photoelectrons stops instantly. Since no additional current is passed through the crystal, the voltage decay across the crystal is stricly dependent upon the RC discharge time of the crystal itself. Typically this RC time constant is in the neighborhood of 0.1 second.

A detailed schematic representation of converter unit 10 is shown in FIGS. 3, 4 and 5. Enclosure 21 is illustrated as a tubular unit preferably made of stainless steel and sealed in a vacuum-tight relationship with a base wall 30 by a flange ring 31 secured by bolts 32 to an anchor structure 33 adjacent to input window 22. A magnetic coil 34 coaxially disposed about enclosure 21 facilitates focusing of the photoelectrons in transit to crystal 18. A high voltage coaxial accelerating ring 35 and transverse screen 36 adjacent to crystal 18 are electrically connected to an external D-C power source $S_1$ by lead 37.

The window and photocathode assembly is shown in FIG. 4 in exaggerated dimensions for the sake of clarity of explanation and comprises the translucent window 22, a semi-transparent film 39 of chromium formed by evaporation directly on the inner surface of the window, and a layer 23 of photocathode material such as cesium antimonide ($Cs_3Sb$) formed on the chromium layer. A conductive ring 41 formed on the periphery of the window in electrical contact with the chromium layer 39 is connected by electrical lead 42 to an external ground connection. The window-photocathode assembly preferably is prepared by cleaning the glass substrate 22, evaporating a semi-transparent film of chromium on the internal surface, and evaporating a chromium ring on the periphery of the substrate for the external electrical connection. Antimony is then evaporated on the chromium film to a thickness adjusted by monitoring the optical transmission of the film. Finally the photocathode is completed by exposing the evaporated antimony film to cesium vapor.

The crystal-dielectric mirror assembly 43, see FIGS. 3 and 5, is mounted on a conductive plate 44 secured to rigid conductors 45 and 46, preferably made of solid rods, which pass through and are mounted on base wall 30 by insulators 47 and 48, respectively. Conductors 45 and 46 are connected to an external D-C power supply $S_2$. Plate 44 has a central opening 49 covered by assembly 43 and aligned with an opening 50 in base wall 30 covered and sealed by transparent window 51.

Assembly 43 comprises a glass substrate 52 coated with a transparent conductive film 53 such as tin oxide. The electro-optic crystal 18 is bonded to substrate 52 in electrical contact with conductive film 53 by an epoxy bonding substance 54 such as EPO-Tek 301 manufactured by Epoxy Technology Inc., Watertown, Mass. The side of the crystal facing the photocathode is covered with dielectric reflective coating 27 which serves to reflect the coherent laser beam incident on the crystal. In addition, this dielectric mirror serves to protect the crystal 18 from direct electron bombardment and additionally shields the photocathode 23 from the highly intense coherent light. Conductive film 53 provides electrical contact between crystal 18 and plate 44 so that the crystal may be properly biased by a high voltage source $S_2$ which, by way of example, may be in the order of 10 kV.

In addition to the foregoing functions, the dielectric mirror 27 must possess the following electrical and mechanical characteristics in order that the converter unit shall function properly:

Optical Properties:
   Good reflector for laser light used
   High optical quality
Mechanical Properties:
   Good adherence to electro-optical crystal
   Durable — not damaged by high-energy electrons or cesium vapor
   Stable over large temperature range
Electrical Properties:
   Low secondary emission
   High surface resistance, i.e., sheet resistance of $10^{14}$ ohms per square or higher (a good insulator)
   Electrically conducting front to back (under proper conditions)

While most commercially available high quality dielectric mirrors provide the required optical properties, they are not designed to satisfy the electrical requirements. In accordance with this invention, the following procedure was used for forming a dielectric mirror on a KD*P crystal in order to achieve the properties identified above.

Dielectric mirror 27 is formed by evaporating films of alternately high and low refractive index on the KD*P crystal face. From the optical-performance point of view, a larger number of layers yields a better reflection. However, a requirement exists that the total film thickness be sufficiently thin to permit electron conduction through the dielectric mirror. This requirement limits the number of layers that may be used. In general, we have found this limit to be nine layers, each having an optical thickness of $\lambda/4$ and a preferred thickness of five layers has been found to provide a good compromise between optical and electrical performance characteristics.

After polishing to a thickness of 2–3 mm or less the KD*P crystal was coated with the dielectric reflector. Evaporation may be performed in a standard belljar system. The crystal was mounted on a substrate heater and the chamber evacuated. Crystal temperature was slowly raised to 105°C and maintained at that level for a period of approximately 15 minutes. After this outgassing, the temperature of the crystal was dropped to 100°C and stabilized. The evaporations consisted of alternate layers of first silicon monoxide (SiO) and then calcium fluoride ($CaF_2$). Typically, five layers are used, the last layer being of silicon monoxide. After evaporations, crystal temperature was gradually reduced to room temperature and the crystal was then ready for bonding to the conductively coated glass substrate 52.

In operation, incoherent light incident on window 22 causes photoelectrons to be emitted by photocathode 23 and to be quickly accelerated from ground to approximately ¾ of the maximum impact potential in a region near the photocathode. A second acceleration of the photoelectrons takes place in the region between screen 36 and crystal 18. With approximately 10 kV applied to the opposite side of the crystal by conductors 45 and 46 and with no image on the illuminated photocathode, the maximum impact voltage of 10 kV is developed at the crystal as electrons strike the dielectric mirror. As an image is applied to the photocathode, the electron current changes so that impact voltage across the crystal varies between the maximum of 10 kV and a minimum approximately 8 kV thereby producing a voltage drop across the crystal in the range of 2 kV. Variation in impact current of the photoelectrons on the mirrored surface of the crystal thus produces a voltage pattern on it which corresponds to the incoherent image at the input of the converter unit. Accordingly the crystal is conditioned to modulate coherent light passing through it to correspond with that image and the coherent light emerging from the crystal therefore contains the information originally impressed on the photocathode. The modulated coherent beam is then directed to selected utilization equipment for further processing by well known optical components.

By way of example, operating parameters of a system which has been constructed and satisfactorily operated are as follows:

| | |
|---|---|
| Type of coherent light | HeNe laser |
| Photocathode | S-11 |
| Area of polarizer | 11 by 11 mm |
| Useful image area | 13 by 13 mm |
| Resolution | 50 Lp/cm |
| Contrast ratio | >100:1 |
| Information display rate | real time |
| Operating crystal temperature | room temperature |
| Maximum operating voltage | 10 kV |
| Electron focusing method | magnetic |
| Maximum focus field | 260 gauss |
| Operating mode** | $\delta < 1$ |
| Electro-optical crystal | KD*P |

** $\delta$ is the secondary-emission ratio of the electro-optical crystal target.

What is claimed is:

1. An incoherent to coherent image converter unit comprising
   a vacuum-tight enclosure having first and second end walls and first and second windows spaced and aligned along an optical axis and mounted in said end walls, respectively,
   a magnetic coil coaxially disposed around the exterior of said enclosure,
   a photocathode formed on the inner surface of said first window and adapted to produce photoelectrons in response to an incoherent light image incident thereon from said first window,
   a coaxial accelerating ring within said enclosure adjacent to said photocathode,
   means for applying a high voltage to said ring for axially accelerating photoelectrons from said photocathode in a direction toward said second window,
   a conductive plate traversing said axis in said enclosure between said second window and said ring,
   said plate having a central opening therein axially aligned with said second window,
   conductive rods extending through and insulated from the second end wall and connected to said plate for electrically energizing and mechanically supporting same,
   a source of electrical energy connected to said rods,
   a glass substrate mounted over said central opening on the side of said plate facing said photocathode,
   a transparent conductive film covering the face of said substrate opposite from said plate and being electrically connected to said plate,
   an electro-optic crystal conductively cemented to said film on the substrate and traversing said optical axis and having axially spaced parallel sides perpendicular to said axis,
   a dielectric reflective layer on the side of said crystal facing said photocathode and adapted to intercept photoelectrons therefrom,
   said layer being characterized by a thickness sufficient to permit electron conduction therethrough whereby to modulate said crystal with a pattern corresponding to said incoherent light image,
   a source of coherent light,
   means for directing an output beam from said coherent light source successively through said second window and the central opening in said plate and said substrate and said crystal and against said dielectric reflective layer for reflection thereby in the opposite direction whereby said beam is phase modulated corresponding to the image modulation of the crystal, and
   means for processing said image modulated coherent light beam.

* * * * *